Figure 1:
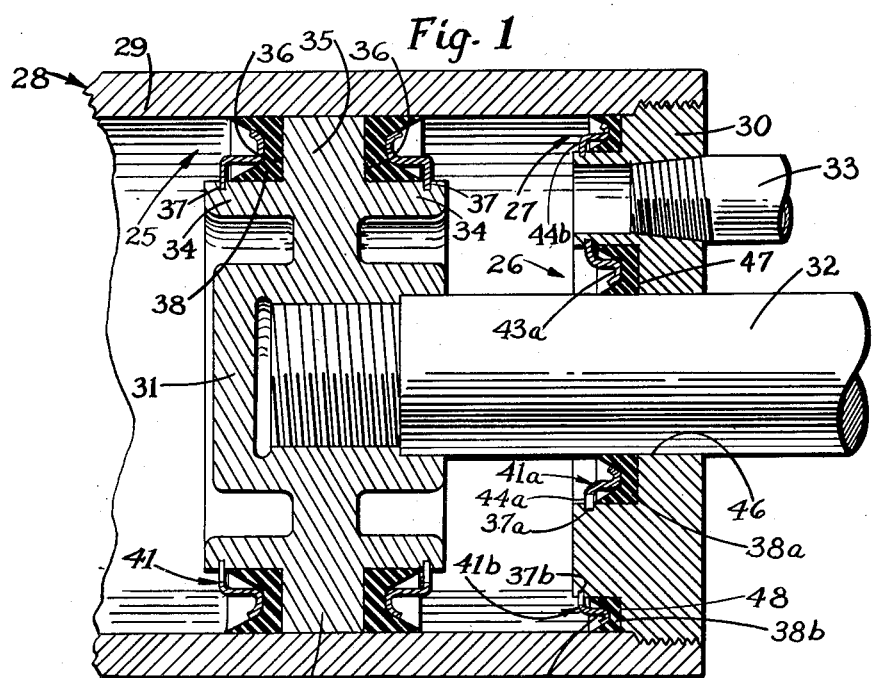

April 24, 1951  J. F. JOY  2,549,818
SEALING DEVICE

Filed Aug. 23, 1945  3 Sheets-Sheet 1

INVENTOR.
Joseph F. Joy
BY
J. H. Church & W. E. Thibodeau
ATTORNEYS

April 24, 1951 J. F. JOY 2,549,818
SEALING DEVICE
Filed Aug. 23, 1945 3 Sheets-Sheet 2
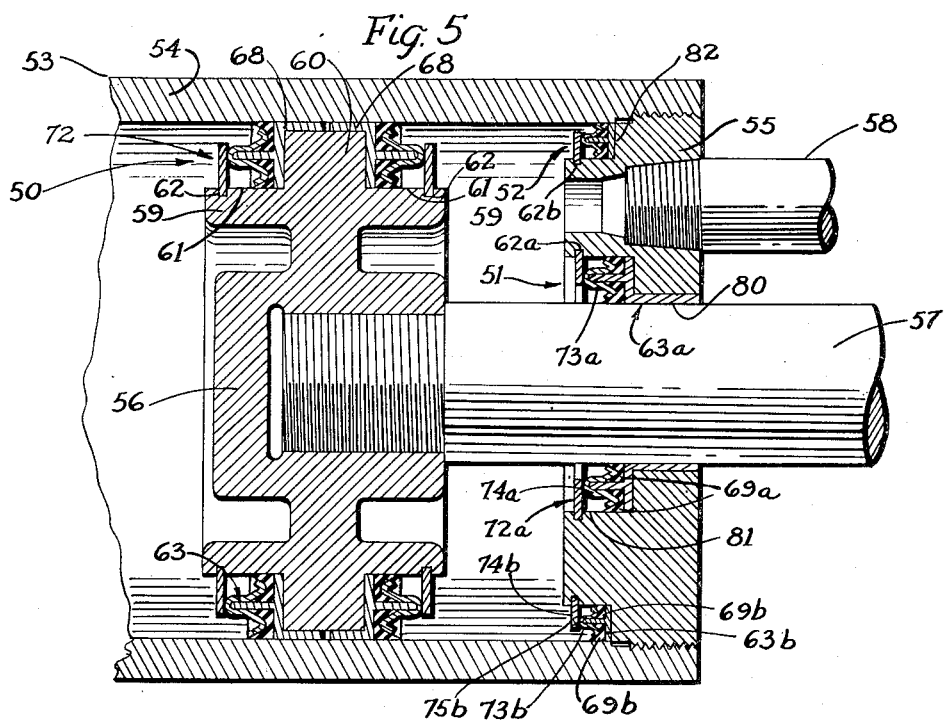
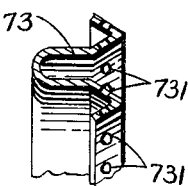
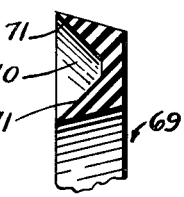
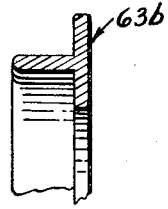
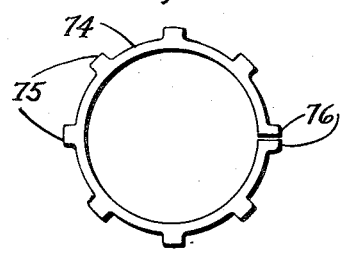
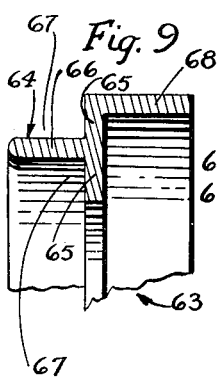
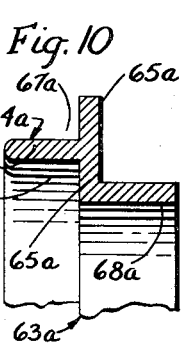
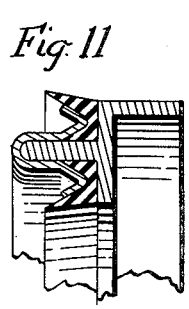
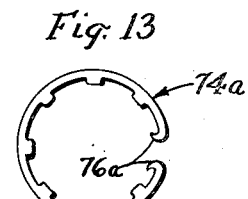
INVENTOR.
Joseph F. Joy
BY
J. H. Church & H. E. Thibodeau
ATTORNEYS April 24, 1951          J. F. JOY          2,549,818
SEALING DEVICE
Filed Aug. 23, 1945          3 Sheets-Sheet 3
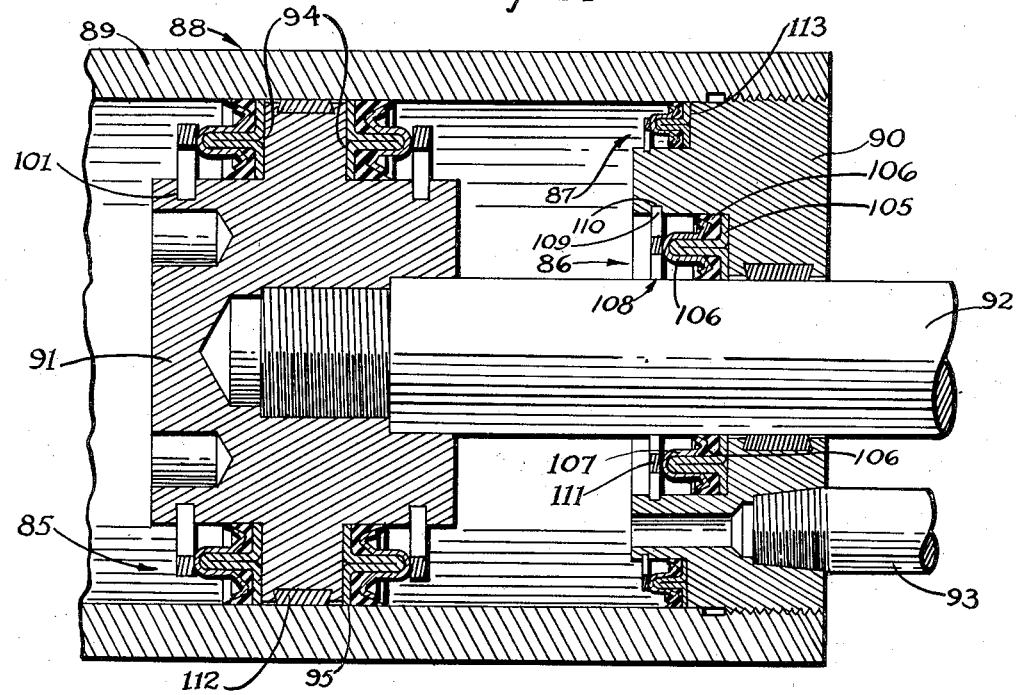
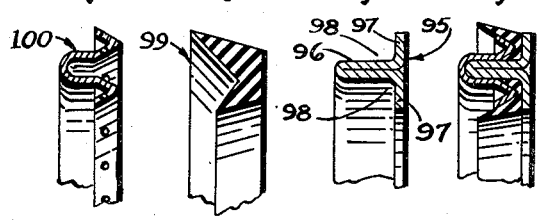
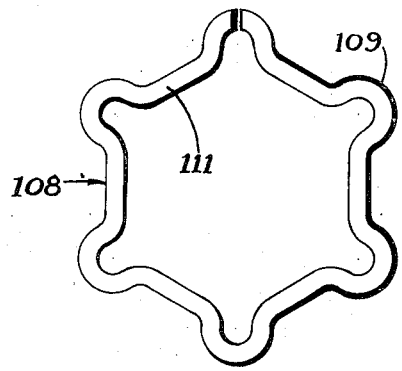
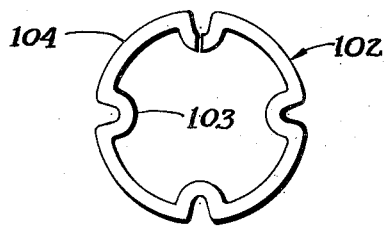
INVENTOR.
Joseph F. Joy
BY
J. H. Church & A. E. Thibodeau
ATTORNEYS Patented Apr. 24, 1951

2,549,818

UNITED STATES PATENT OFFICE 2,549,818

SEALING DEVICE

Joseph F. Joy, Warren, Ohio

Application August 23, 1945, Serial No. 612,291

23 Claims. (Cl. 309—33)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to sealing devices, particularly to such devices used as piston, packing, and rotary shaft seals, and the principal object of my invention is to provide new and improved sealing devices.

Figures 2, 3, 4:
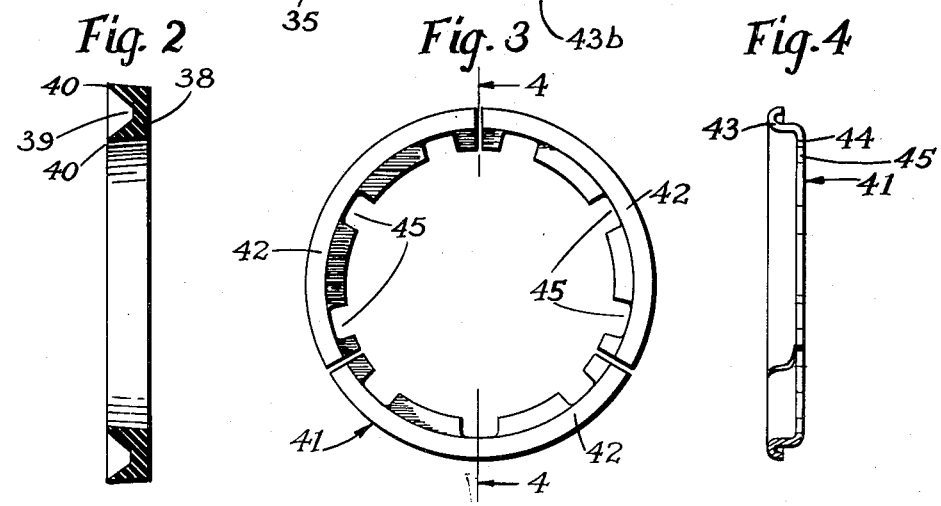

In the drawings accompanying this specification, and forming a part of this application, there are shown, for purposes of illustration, several embodiments which my invention may assume, and in these drawings:

Figure 1 is a fragmentary longitudinal sectional view through a hydraulic cylinder, illustrating one embodiment of the invention, Figure 2 is a sectional view through a sealing ring, showing its cross-sectional shape prior to assembly, Figure 3 is a plan view of a sectional retainer device, Figure 4 is a section corresponding generally to the line 4—4 of Figure 3, Figure 5 is a fragmentary sectional view, similar to Figure 1, but showing another embodiment of the invention, Figures 6 through 10 are fragmentary sectional views of parts used in the construction shown in Figure 5, Figure 11 is a fragmentary sectional view showing the assembly of certain parts, Figures 12 and 13 are plan views of retainer devices used in the construction illustrated in Figure 5, Figure 14 is a fragmentary sectional view, similar to Figure 5, but showing still another embodiment of the invention, Figures 15 through 18 are fragmentary sectional views of parts used in the construction shown in Figure 14, and Figures 19 and 20 are plan views of retainer devices used in the construction illustrated in Figure 14.

As seen in the drawings, with particular reference to Figures 1, 5, and 14, it will be evident that the invention has ready application either as a piston seal, a shaft seal, or a packing seal. It is to be understood, however, that the invention is not limited to the particular sealing constructions herein disclosed, and that it has application any place where two or more parts, either relatively movable or stationary, form a joint which is to be sealed.

Referring particularly to Figures 1 through 4, the embodiment of the invention therein disclosed is shown as applied to a piston seal 25, a shaft seal 26, and a packing seal 27. All of the foregoing seals are embodied in a cylinder construction 28, here shown as comprising a cylinder 29, having an end closure wall 30 threaded therein, and a piston 31 reciprocable within the cylinder 29, movement of the piston 31 being effected by connection to a piston rod 32 having threaded connection with the piston 31. A fluid conduit 33 is threaded into a hole in the end closure wall 30 to afford communication with the interior of the cylinder.

The peripheral portion of the piston 31 is generally of T cross-section, as seen in Figure 1, comprising base legs 34 and an extending leg 35. Each base leg 34 cooperates with the extending leg 35 to form an annular groove 36 in the opposite faces of the piston 31, the peripheral surface of the extending leg 35 forming a guide surface adapted to slidably engage the inner wall of the cylinder 29, and thus guide movement of the piston. Each base leg 34 is formed with a recess 37 spaced outwardly from the extending leg 35, and these recesses may be annular in formation.

Seated within each of the grooves 36 is sealing means formed of a suitable resilient material, such as rubber, neoprene or the like, either alone or impregnated or incorporated with any suitable substance to increase its sealing and wearing qualities. The sealing means herein shown comprises an annular ring-like member 38 having a face wall and an inner annular surface adapted to closely fit the complementary surfaces of the piston groove 36. The opposite face wall is formed with an annular groove 39, somewhat V-shaped in cross-section, forming spaced-apart sealing lips 40 at the inner and outer annular surfaces of the ring-like member 38. As seen in Figure 2, the inner and outer annular surfaces of the member 38 diverge slightly with respect to the axis of the member. However, when the member 38 is in position on the piston 31, and within the cylinder 29, the inner and outer surfaces are substantially parallel to the axis of the member 38. Thus, at all times, the member 38 is slightly deformed from its free state as shown in Figure 2, providing a compression of the member against walls of the piston and cylinder to effect perfect sealing, even when the piston is stationary. It will be appreciated that fluid pressure on either face of the piston 31 will act against the V-shaped walls of the respective sealing member 38 and urge the sealing lips 40 against respective surfaces of the cylinder 29 and piston 31 with considerable pressure, thus insuring perfect sealing during movement of the piston.

Holding means 41 are provided for holding respective sealing members 38 in position on the piston, and comprises a part disposed intermediate the spaced-apart sealing lips 40 and bearing against the trough of the V-shaped groove 39, and a part engaging the piston 31. As shown in Figures 1 through 4, the holding means 41 is formed of three sections 42, each in cross-section (see Figure 4) having a reverse bend, forming the two parts hereinbefore referred to. The part 43 fits within the groove 39 of the sealing member 38 and partly along the inclined walls forming the groove in this member, and the part 44 seats within the recess 37 formed in the piston 31.

Movement of each section of the holding means 41 to its assembled position shown in Figure 1 is effected by the use of at least some pressure, so that the sections 42 are held in place, either by the resiliency of the sealing member 38 or by the spring of the holding means 41, or by both, thus insuring against unintentional displacement of the holding means 41. The part 44 of the holding means 41 is formed with notches 45 (see particularly Figure 3) so that fluid under pressure has access to the adjacent inclined wall of the sealing member 38. It will be appreciated that the sealing members 38 and the holding means 41 may be assembled with the piston 31 to form a unitary piston construction which then may be assembled with the cylinder.

The shaft seal 26 is formed of parts generally similar to the parts of the piston seal 25, and such similar parts will be referred to by the same reference numerals supplemented with the suffix "a".

The end closure wall 30 is formed with an aperture 46 to pass the piston rod 32, this aperture being enlarged at the inner face of the end wall, forming an annular groove 47 in which is seated the sealing member 38a. An annular recess 37a is formed in the axially extending wall of the groove, for receiving the part 44a of the holding means 41a. The part 43a of the holding means 41a is disposed intermediate the sealing lips of the sealing member 38a, and the holding means 41a and sealing member 38a cooperate in the same manner as that described with respect to the piston seal 25. The shaft seal 26 performs equally well, regardless of whether the shaft 32 reciprocates or rotates.

The packing seal 27 also is formed of parts generally similar to the parts of the piston seal 25, and such corresponding parts will be given the same reference numbers supplemented with the suffix "b."

The end wall closure 30 is formed with an annular groove 48 at an inner face wall thereof, this groove receiving the sealing member 38b. The axially extending wall of the groove 48 is formed with an annular recess 37b for receiving the part 44b of the holding means 41b. The part 43b of the holding means is disposed intermediate the sealing lips of the sealing member 38b, and the holding means 41b and sealing member 38b cooperate in the same manner as that described with respect to the piston seal 25. In this case, it will be noted that the two parts forming the joint to be sealed are relatively stationary.

Referring to the embodiment disclosed in Figures 5 through 13, the invention is shown as applied to a piston seal 50, a shaft seal 51 and a packing seal 52. All of these seals are embodied in a cylinder construction 53, here shown as comprising a cylinder 54, having an end closure wall 55 threaded therein, and a piston 56 reciprocable within the cylinder 54, movement of the piston 56 being effected by connection with a piston rod 57 having threaded connection with the piston 56. A fluid conduit 58 is threaded into a hole in the end closure wall 55 to afford communication with the interior of the cylinder.

The peripheral portion of the piston 56, as before, is generally of T cross-section, as seen in Figure 5, comprising base legs 59 and an extending leg 60. Each base leg 59 cooperates with the extending leg 60 to form an annular groove 61 in the opposite faces of the piston 56. Each base leg 59 is formed with a recess 62 spaced outwardly from the extending leg 60, and these recesses may be annular in formation.

In this embodiment, rigid means 63 are seated in the annular grooves 61 of the piston 56. Each of the rigid means 63 herein shown comprises a generally T-shaped portion 64 (see Figure 9) having base or head legs 65 and an extending leg 66, these legs forming a pair of annular grooves 67. Extending in an axial direction from the extremity of the outermost base or head legs 65 is an annular wall 68, the outer surface of which closely fits the interior of the wall of the cylinder 54. The annular walls 68 of the rigid means 63, considering the assembly as shown in Figure 5, face each other, and preferably stop short of contact. The rigid means 63 may be formed of a suitable bearing metal, and by a die-casting method. The walls 68 form a ring about the extending leg 60 of the piston 56, this ring having sliding engagement with the interior surface of the cylinder 54 to guide movement of the piston 56. Thus, it will be appreciated, that close tolerances between the piston and cylinder wall are unnecessary. Further, after extreme wear, only the relatively inexpensive rigid means 63 need be replaced to again maintain proper tolerance between the piston and the cylinder wall.

Seated within each of the annular grooves 67 of the rigid means 63, is a sealing means, which as before, comprises an annular ring-like member 69 which may be formed of any suitable resilient sealing material, such, for example, as those mentioned in connection with the ring-like member 38. Each of the members 69 has a face wall and an inner or outer surface adapted to closely fit the complementary surfaces of the grooves 67 formed in the rigid means 63.

The opposite face of each of the members 69 is formed with an annular groove 70 (see Figure 7), generally V-shaped in cross-section, forming spaced apart sealing lips 71 at the inner and outer annular surfaces of the respective member 69. As before, the inner and outer annular surfaces of each ring-like member 69 diverge slightly with respect to the axis of the member, so that compression of the member is effected when the piston construction is assembled with the cylinder 54.

Holding means 72 are provided for the sealing means, and comprise a part disposed intermediate the spaced-apart sealing lips 71 and bearing against the trough of the V-shaped groove 70, and a part engaging the piston. In the embodiment of the invention shown in Figures 5 through 13, the holding means 72 comprises an annular spring-clip ring 73, generally W-shaped in cross-section. The ends of the legs of the ring 73 are each bent to fit individually within the trough of the groove in each sealing member 69, intermediate the sealing lips, and the expansible bight of the ring is adapted yieldingly to clip over or straddle the extending leg 66 of the rigid means 63, thus holding the sealing members assembled with the rigid means. The ring 73 is formed with a series of apertures 731 to provide for passage of fluid to the sealing means.

A snap ring 74 is seated within the recess 62 and holds the sealing member 69, rigid means 63, and the spring-clip ring 73 with the piston 56, and when the parts are assembled the opposed legs of the ring 73 yieldingly urge the sealing lips 71 in opposite directions into sealing contact with the surfaces to be sealed. As herein shown, the snap ring 74 is formed with spaced-apart radial abutments 75 adapted to bear against the bight of the spring-clip ring 73, so that fluid under pressure may readily reach the inclined surfaces of the inner sealing member 69, thus insuring that the walls forming these inclined surfaces will have contact with fluid under pressure. The snap ring 74 has spaced lugs 76, so that any suitable tool, such as the blade of a screw driver, may be inserted therebetween for the purpose of expanding the ring 74, so that it may be assembled or disassembled with respect to its position on the piston 56.

The shaft seal 51 is formed of parts generally similar in construction to the parts of the piston seal 50, and such parts will be referred to by the same reference numerals supplemented with the suffix "a".

The end closure wall 55 is formed with an aperture 80 to provide for passage of the piston rod 57, and this aperture is enlarged at the inner face of the wall to form an annular groove 81 in which is seated an annular rigid means 63a. The rigid means is formed with a generally T-shaped portion 64a (see Figure 10) having base legs 65a and an extending leg 66a, these legs forming a pair of annular grooves 67a. Extending in an axial direction from the extremity of the innermost base leg 65a is an annular wall 68a, the inner surface of which closely fits about the piston rod 57, and the exterior surface of which closely fits within the aperture 80 formed in the end closure wall 55. The rigid means 63a may be formed of a suitable bearing metal, and further may be formed by a die-casting method, and the wall 68a guides movement of the piston rod 57.

Seated within each of the annular grooves 67a of the rigid means 81, is a sealing means, which as before, comprises an annular ring-like member 69a which may be formed of any suitable resilient sealing material. Each of the members 69a has a face wall adapted to closely fit the complementary surfaces of the grooves 67a formed in the rigid means 63a.

The opposite face of each of member 69a is formed with an annular groove, like the groove 70 in the member 69, and the groove is generally V-shaped in cross-section, forming spaced-apart sealing lips. Also, the inner and outer annular surfaces diverge slightly with respect to the axis of the member, to provide for compression of the member at the sealing lips, when the seal construction is assembled with the piston rod 57.

Holding means 72a are provided for the sealing means, similar to the holding means 72 hereinbefore described, and comprise an annular spring-clip ring 73a and a snap ring 74a, the latter seating in an annular recess 62a formed in a wall surface of the groove 81. However, the snap ring 74a must be contracted in size in order to be assembled in the recess 62a, and for this purpose, lugs 76a are formed in the split of the ring, adapted to be engaged by a suitable tool for the purpose of contracting the ring. The snap ring 74a has spaced-apart radial abutments adapted to bear against the bight of the spring-clip ring 73a, so that fluid under pressure may readily reach the adjacent inclined surfaces sealing member 69a.

The packing seal 52 also is formed of parts generally similar in construction to the parts of the piston seal 50, and corresponding parts will be given the same reference numbers supplemented with the suffix "b."

The end closure wall 55 is formed with an annular groove 82 at an inner face wall thereof, this groove receiving a rigid means 63b which is of generally T-shape, forming annular grooves for receiving the sealing members 69b. An annular spring clip ring 73b clips over the leg of the T, and a snap ring 74b seats in a recess 62b formed in the end wall 55, and has radial abutments 75b bearing against the bight of the spring clip ring. The snap ring 74b is expanded when assembled or disassembled with respect to the end wall 55.

Referring to Figures 14 through 20, the invention therein shown is applied to a piston seal 85, a shaft seal 86, and a packing seal 87. These seals are embodied in a cylinder construction 88 comprising a cylinder 89, having an end closure wall 90 threaded therein, and a piston 91 reciprocable within the cylinder, movement of the piston 91 being effected by connection with a piston rod 92. A fluid conduit 93 is threaded into a hole in the end closure wall 90 to afford communication with the interior of the cylinder.

Referring first to the piston seal 85, the piston, as before, is generally of T-section at its peripheral portion, and has annular grooves 94 formed in its opposite faces. Seating in each of the grooves 94 is a rigid means 95, which in this case may be formed of a blank of sheet metal folded upon itself to form the extending leg 96 of a T, and the ends of the sheet extend angularly from the folded section to form the base legs 97 of the T.

The legs 96 and 97 provide inner and outer annular grooves 98, in which are seated sealing members 99 which are similar to the sealing members 38 and 69 hereinbefore described. An annular spring-clip ring 100, similar to the ring 73, is clipped over the extending leg 96 of the rigid means, as before. The piston is formed with an annular recess 101, in which is seated a snap-ring 102 which is generally of cloverleaf outline, having portions 103 seating in the recess 101, and portions 104 positioned to bear against the bight of the spring-clip ring 100 and thus hold it, the sealing member 97, and the rigid means 95 in position on the piston 91. The piston 91, at the periphery of its T section, may be provided with an inset ring 112, of good bearing metal, thus reducing the need of close tolerances between the piston proper and the cylinder wall.

The shaft seal 86 comprises rigid means 105, sealing members 106 and a spring-clip ring 107 in all respects similar to the rigid means 95, sealing members 99, and spring-clip ring 100, of the piston seal 85, with the exception of size. A snap ring 108 has portions 109 seated within an annular recess 110 formed in the end wall 90, and portions 111 adapted to bear against the bight of the spring-clip ring 106.

The packing seal 87 is in all respects similar to the piston seal 85, with the exception that the sizes of the various parts are altered to fit within the annular groove 113 formed in the end wall 90.

In all of the foregoing constructions, it will be seen that by reason of the disposition of the sealing lips on the sealing members, fluid is sealed against passage through the joint, as well as around the piston, or end wall surface as the case may be, against which the sealing members bear.

From the foregoing, it will be apparent to those skilled in the art that I have accomplished at least the principal object of my invention, and it also will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. In apparatus having at least two parts forming a joint which is to be sealed, and having groove means and recess means; sealing means removably seated in said groove means, so constructed and arranged as to effect sealing of the joint; and sectional means for holding said sealing means in seating position in said groove means, each section comprising a portion seating in said recess means and a portion bearing against said sealing means.

2. In apparatus having at least two parts forming a joint which is to be sealed, one of said parts having groove means and recess means; sealing means removably seated in said groove means, so constructed and arranged as to effect sealing of the joint; and sectional means for holding said sealing means in seating position in said groove means, each section comprising a portion seating in said recess means and a portion bearing against said sealing means; the foregoing construction being such that said sealing means and said sectional means may be assembled as a unit with said one part.

3. In apparatus having at least two parts forming a joint which is to be sealed; rigid means assemblable with one of said parts; sealing means, positioned on said rigid means; spring clip means, constructed and arranged to hold said sealing means in position on said rigid means, said rigid means having a portion with which said spring clip means has portions in yielding clipping engagement; and holding means bearing directly against said spring clip means, for holding said sealing means and said rigid means in positon on said one part.

4. In apparatus having at least two parts forming a joint which is to be sealed; rigid means of substantially T-section assemblable with one of said parts; a pair of sealing members, each seated in a respective angle portion formed by the extending leg and the base of the T; spring clip means, engaged over the extending leg of the T, and having portions bearing against respective ones of said sealing means; and holding means, bearing against said spring clip means, for holding said sealing means and said rigid means in position on said one part.

5. In apparatus having at least two parts forming a joint which is to be sealed; rigid means, assemblable with one of said parts, and being of substantially T cross-section; a pair of sealing members, each seated in a respective angle portion formed by the extending leg and the head of the T; spring clip means, having an expansible portion yieldingly engaged over the extending leg of the T, and having portions projecting outwardly in opposite directions from said expansible portion and bearing against respective ones of said sealing members to hold the sealing portions of the latter outwardly in sealing position; and means holding said sealing members and said rigid means in position on said one part.

6. In apparatus having at least two parts relatively movable with respect to each other and forming a joint which is to be sealed; rigid means, carried by one of said parts, and being of T cross-section, and having a guide portion extending from the T and in position for slidable engagement with the other of said parts; a pair of sealing members, each seated in a respective angle portion formed by the leg and head of the T; spring clip means, having an expansible portion yieldingly engaged over the leg of the T, and having portions projecting outwardly in opposite directions from said expansible portion and bearing against respective ones of said sealing members to hold the sealing portions of the latter outwardly in sealing position; and holding means, bearing against the outer surface of said expansible portion of said spring clip means, for holding said sealing members and said rigid means in position on said one part.

7. In a cylinder construction; a piston reciprocable within the cylinder, and having a peripheral groove and a recess; a rigid member, seated within said groove, and being substantially of T cross-section; a pair of sealing members, each seated in a respective angle portion formed by the leg and head of the T; spring clip means, having an expansible portion yieldingly engaged over the leg of the T, and having portions projecting outwardly in opposite directions from said expansible portion and bearing against respective ones of said sealing members to hold the sealing portions of the latter radially outwardly in sealing position; and a spring ring, snapped into said recess and bearing against the outer surface of said expansible portion of said spring clip means.

8. In apparatus having at least two parts forming a joint which is to be sealed, resilient sealing means carried by one of said parts and adapted to expand radially into peripheral sealing contact with a joint-surface to be sealed when held under compression, and sectional retaining means for holding said sealing means against axial displacement with respect to said one part and for maintaining said sealing means under compression comprising coacting retainer sections assemblable in direct contact with a surface of said one part and disposed in holding relation with respect to said sealing means with the latter under compression, each retainer section being moved to holding position by application of force against resilient opposition to said force, and being held in assembled position in such direct contact with the opposed surface of said one part by force providing said resilient opposition.

9. In apparatus having at least two parts forming a joint which is to be sealed, resilient sealing means carried by one of said parts and adapted to be held under compression to effect radial expansion thereof into peripheral sealing contact with a joint surface to be sealed, and retaining means also carried by said one part and reacting directly against a supporting surface thereon and bearing against said sealing means for holding said sealing means against axial displacement with respect to said one part with said sealing means maintained under compression, said retaining means being moved to assembled position with said sealing means and said one part by temporarily distorting said sealing means to pass said retaining means, said retaining means being locked in assembled position to said one part against said supporting surface by the reaction resulting by return of said sealing means from its temporarily distorted relation.

10. In apparatus having at least two parts forming a joint which is to be sealed, resilient sealing means carried by one of said parts and adapted when held under compression to expand radially into peripheral sealing contact with a joint-surface to be sealed, and sectional retaining means also carried by said one part comprising coacting retaining sections reacting against a surface on said one part and bearing against said sealing means for holding the latter against axial displacement with respect to said one part and for maintaining said sealing means under compression, each section of said retaining means being moved to assembled position with said sealing means by temporarily distorting an adjoining portion of said sealing means to pass said section, and each of said sections being held locked in the assembled position against said surface on said one part by the reaction resulting by the return of said sealing means from its temporarily distorted relation.

11. In apparatus having at least two parts forming a joint which is to be sealed, one of said parts having a seal receiving groove and recess means formed in one of the wall surfaces comprising said groove, resilient sealing means seated within said groove, and sectional retaining means for holding said sealing means against displacement, each section having a portion seatable within said recess means and moved to seating relation by temporarily flexing either or both said section and said sealing means, and each section being held in seating relation by force opposing said flexing movement.

12. In apparatus having at least two parts forming a joint to be sealed, replaceable annular means carried by one of said parts and providing at least two concentric seal receiving grooves, annular sealing means seated in each of said grooves with said sealing means arranged in opposed relation, and holder means engaging said replaceable means and common to said sealing means and having oppositely extending resilient portions individually yieldingly bearing against each sealing means for holding said sealing means in opposed sealing position in said grooves with the sealing portions of said sealing means pressed radially outwardly against the surfaces to be sealed.

13. In apparatus having at least two relatively movable parts, a replaceable annular wear member carried by one of said parts and adapted to define clearance between said parts, said wear member providing at least two inner and outer concentric seal receiving grooves, annular sealing means arranged in opposed relation with one sealing means seated in each of said grooves, and holding means carried by said one part and engaging said wear member and having oppositely extending resilient holding portions individually yieldingly bearing against said sealing means for maintaining the latter in sealing relation with the sealing portions of said sealing means pressed outwardly against the surfaces to be sealed.

14. In apparatus having at least two parts forming a joint to be sealed, wall means carried by one of said parts and forming a pair of seal receiving grooves, sealing means seated in each of said grooves, and clip means having an expansible portion yieldingly engaging and straddling said wall means and having portions projecting outwardly in opposite directions from said expansible portion and bearing against respective ones of said sealing means for holding the sealing portions of the latter outwardly in sealing position.

15. In apparatus having at least two parts forming a joint to be sealed, wall means carried by one of said parts and forming a pair of seal receiving grooves, sealing means seated in each of said grooves, clip means having an expansible portion yieldingly engaging and straddling said wall means and having portions projecting outwardly in opposite directions from said expansible portion and bearing against respective ones of said sealing means to hold the sealing portions of the latter outwardly in sealing position, and retainer means carried by said one part and engaging said expansible portion of said clip means for holding said clip means in position.

16. In a piston construction, a replaceable annular wear member extending peripherally of said piston and a cylinder wall, said wear member having a generally radially extending portion providing at least two inner and outer concentric seal receiving grooves and said wear member having a concentric portion separating said grooves, and annular holding means carried by said piston and engaging said concentric portion and having oppositely extending resilient portions individually yieldingly bearing against said sealing means for maintaining the latter in sealing relation with the sealing portions of said sealing means pressed radially outwardly against the surfaces to be sealed.

17. In a piston construction, a replaceable wear member extending peripherally of said piston and adapted to define clearance between said piston and a cylinder wall, said wear member having a generally radially extending portion provided with a wall extending transversely therefrom to form a pair of seal receiving grooves, sealing means seated in each of said grooves, means having an expansible portion yieldingly engaging and straddling said wall and having portions projecting outwardly in opposite directions from said expansible portion and bearing against respective ones of said sealing means to hold the sealing portions of the latter radially outwardly in sealing position, and means carried by said piston and engaging said expansible portion of said engaging and straddling means for holding said engaging and straddling means in position.

18. In a sealing device, a part having generally peripherally disposed recess means, a seal construction carried by said part, and retainer means having a generally undulated formation for holding said seal construction in position, said retainer means having its troughs seated within said recess means and its crests bearing against said seal construction.

19. In a sealing device, a part having a peripheral step construction providing a peripherally extending groove and having an annular recess provided in the axially extending wall forming said step construction, a seal construction seated in said groove, and a snap ring retainer, having an undulated formation, for holding said seal construction in position, said snap ring having its troughs seated within said recess and its crests bearing against said seal construction.

20. In a sealing device, a part having a peripheral step construction providing a peripherally extending groove and having an annular recess provided in the axially extending wall forming said step construction, a seal construction seated within said groove, and a retainer ring for holding said seal construction in position, having radially extending projections seated in said recess.

21. In apparatus having at least two parts forming a joint which is to be sealed; rigid means of generally T-shape in cross section and assemblable with one of said parts; sealing means, positioned on said rigid means and having flexible sealing portions engaged by the opposed arms of the head of the T; spring clip means, constructed and arranged to hold said sealing means in sealing position on said rigid means, said spring grip means being of generally U-shape in cross section having its U-portions providing a groove for receiving the leg of the T, the sides of the U having inherent resilience whereby said clip means is yieldingly clipped onto the leg of the T; and holding means, attached to said one part and bearing against said spring clip means, for holding said sealing means and said rigid means in position on said one part.

22. In an apparatus having at least two concentric parts forming a joint which is to be sealed; rigid means in the form of an annulus assemblable with one of said parts and providing an annular flange portion coaxial with said concentric parts; sealing means, positioned on said rigid means and having flexible sealing portions at the inner and outer surfaces of said annular flange portion; spring clip means comprising an annular resilient clip portion having opposed expansible portions yieldingly engaging the inner and outer surfaces of and supported by said flange portion and having oppositely projecting ends respectively engaging said sealing means to hold the latter in sealing position on said rigid means with said flexible sealing portions spread apart into sealing contact with the surfaces to be sealed; and holding means, attached to said one part and bearing against said spring clip means, for holding said sealing means and said rigid means in position on said one part.

23. An apparatus having at least two concentric parts forming a joint which is to be sealed; annular rigid means assemblable with one of said parts; a sealing ring, positioned on said rigid means and of generally V-shape in cross section; an annular spring clip of generally U-shape in cross section and having resilient portions at the legs of the U having yielding clipped engagement with said rigid means and engaging the flexible lips of said V-shaped sealing ring, said clip arranged to hold said sealing ring on said rigid means; and an annular holding member secured to said one part and bearing directly against said spring clip at points intermediate said resilient leg portions, for holding said sealing ring and said rigid means on said one part.

JOSEPH F. JOY.

REFERENCES CITED

The following references are of record in the file of this patent:

UNITED STATES PATENTS

| Number | Name | Date |
|---|---|---|
| 1,527,956 | Mowers | Feb. 24, 1925 |
| 1,613,066 | Turner | Jan. 4, 1927 |
| 1,725,836 | Solberg | Aug. 27, 1929 |
| 2,059,729 | Dick | Nov. 3, 1936 |
| 2,076,363 | Brunner | Apr. 6, 1937 |
| 2,144,736 | MacClatchie | Jan. 24, 1939 |
| 2,189,839 | Sharp | Feb. 13, 1940 |
| 2,214,261 | Roth | Sept. 10, 1940 |
| 2,295,160 | Christensen | Sept. 8, 1942 |
| 2,313,271 | Schnell | Mar. 9, 1943 |
| 2,329,028 | Austin | Sept. 7, 1943 |
| 2,417,828 | Joy | Mar. 25, 1947 |
| 2,451,269 | Allen | Oct. 12, 1948 |